US012041359B2

(12) United States Patent
Alshurafa et al.

(10) Patent No.: US 12,041,359 B2
(45) Date of Patent: Jul. 16, 2024

(54) METHOD AND SYSTEM FOR ACTIVITY DETECTION WITH OBFUSCATION

(71) Applicant: Northwestern University, Evanston, IL (US)

(72) Inventors: Nabil I. Alshurafa, Chicago, IL (US); Josiah D. Hester, Evanston, IL (US)

(73) Assignee: Northwestern University, Evanston, IL (US)

( * ) Notice: Subject to any disclaimer, the term of this patent is extended or adjusted under 35 U.S.C. 154(b) by 167 days.

(21) Appl. No.: 17/730,858

(22) Filed: Apr. 27, 2022

(65) Prior Publication Data

US 2022/0279119 A1 Sep. 1, 2022

Related U.S. Application Data

(63) Continuation of application No. 17/010,560, filed on Sep. 2, 2020, now Pat. No. 11,336,823.

(60) Provisional application No. 62/895,290, filed on Sep. 3, 2019.

(51) Int. Cl.
| | |
|---|---|
| *H04N 23/80* | (2023.01) |
| *G06T 5/50* | (2006.01) |
| *G06T 5/73* | (2024.01) |
| *G06T 7/194* | (2017.01) |
| *H04N 5/272* | (2006.01) |
| *H04N 5/76* | (2006.01) |
| *H04N 7/18* | (2006.01) |
| *H04N 23/10* | (2023.01) |
| *H04N 23/51* | (2023.01) |
| *H04N 23/54* | (2023.01) |
| *H04N 23/90* | (2023.01) |

(52) U.S. Cl.
CPC ............... *H04N 23/80* (2023.01); *G06T 5/50* (2013.01); *G06T 5/73* (2024.01); *G06T 7/194* (2017.01); *H04N 5/272* (2013.01); *H04N 5/76* (2013.01); *H04N 7/18* (2013.01); *H04N 23/10* (2023.01); *H04N 23/51* (2023.01); *H04N 23/54* (2023.01); *H04N 23/90* (2023.01); *G06T 2207/10024* (2013.01); *G06T 2207/10048* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 11,336,823 | B2 * | 5/2022 | Alshurafa | H04N 5/272 |
| 2010/0115121 | A1 * | 5/2010 | Roos | H04N 21/4335 |
| | | | | 725/110 |
| 2010/0225617 | A1 * | 9/2010 | Yoshimoto | G06F 3/042 |
| | | | | 345/175 |
| 2011/0175461 | A1 * | 7/2011 | Tinaphong | H02J 50/27 |
| | | | | 307/149 |
| 2018/0115705 | A1 * | 4/2018 | Olsson | G06T 5/009 |
| 2018/0253894 | A1 * | 9/2018 | Krishnan | G06T 15/08 |

(Continued)

*Primary Examiner* — Eileen M Adams
(74) *Attorney, Agent, or Firm* — Bell & Manning, LLC

(57) ABSTRACT

A camera system includes a camera configured to capture first video of a scene in the form of first image frames. The camera system also includes an infrared sensor configured to capture second video of the scene in the form of second image frames. The system also includes a processor in communication with the camera and the infrared sensor. The processor is configured to obfuscate one or more portions of the scene.

16 Claims, 12 Drawing Sheets

(56) References Cited

U.S. PATENT DOCUMENTS

| | | | | |
|---|---|---|---|---|
| 2018/0316836 A1* | 11/2018 | Lin | ........................ | G02B 27/18 |
| 2019/0042851 A1* | 2/2019 | Varadarajan | ............ | G06V 40/20 |
| 2019/0138821 A1* | 5/2019 | Mu | ............................ | G06T 7/70 |
| 2020/0209720 A1* | 7/2020 | Grim | ................. | G08B 13/19632 |
| 2021/0042897 A1* | 2/2021 | Tong | ......................... | G06T 5/50 |

* cited by examiner

| | Proposed System | | MobileNetv2 | | Xception | | YOLO3-0.80 | | YOLO3-0.50 | |
|---|---|---|---|---|---|---|---|---|---|---|
| | Hit% | Miss% | Hit% | Miss% | Hit% | Miss% | Hit% | Miss% | Hit% | Miss% |
| V1 (219) | 100 | 0 | 11 | 89 | 33 | 66 | 47 | 53 | 67 | 33 |
| V2 (69) | 100 | 0 | 57 | 43 | 72 | 28 | 62 | 38 | 72 | 28 |
| V3 (50) | 90 | 10 | 84 | 16 | 86 | 14 | 95 | 5 | 98 | 2 |
| V4 (16) | 100 | 0 | 0 | 100 | 0 | 100 | 0 | 100 | 0 | 100 |
| V5 (179) | 100 | 0 | 98 | 2 | 100 | 0 | 100 | 0 | 100 | 0 |
| V6 (128) | 100 | 0 | 85 | 15 | 91 | 9 | 87 | 13 | 92 | 8 |
| V7 (73) | 100 | 0 | 23 | 77 | 0 | 100 | 0 | 100 | 0 | 100 |
| V8 (21) | 100 | 0 | 55 | 45 | 81 | 19 | 75 | 25 | 100 | 0 |
| V9 (54) | 100 | 0 | 6 | 94 | 2 | 98 | 83 | 17 | 83 | 17 |
| V10 (49) | 100 | 0 | 8 | 92 | 61 | 39 | 82 | 18 | 82 | 18 |
| Average | 99 | 1 | 42.7 | 57.3 | 52.5 | 47.4 | 63.1 | 36.9 | 69.4 | 30.6 |

Fig. 6

| | Calling | Yawning | Eating | Wearing Glasses | Drinking | Scratching | Biting Nails | Average |
|---|---|---|---|---|---|---|---|---|
| Asis | 96.15 | 53.85 | 96.15 | 92.31 | 92.31 | 100.0 | 92.31 | 70 |
| Mask | 96.67 | 50.0 | 76.67 | 76.67 | 90.0 | 90.0 | 10.0 | 81 |

| Activity | Object Detection Accuracy (# of Groundtruth Frames with the Object) | | | | | | | |
|---|---|---|---|---|---|---|---|---|
| | P1 | P2 | P3 | P4 | P5 | P6 | P7 | P8 |
| Drinking hot tea in a colored cup | 62.9(105) | 92.6(27) | 0.0(20) | 64.0(25) | 79.2(24) | 56.2(16) | 71.4(28) | 51.4(35) |
| Drinking chilled water in a clear cup | 33.3(21) | 10.0(10) | - | 31.2(16) | 16.7(12) | - | - | 45.5(11) |
| Eating a banana | 5.6(18) | 28.6(14) | 0.0(9) | 0.0(2) | 0.0(13) | 77.8(9) | 0.0(1) | 0.0(9) |
| Calling someone with a phone | 79.4(63) | 57.1(7) | 0.0(38) | 0.0(10) | 100.0(14) | - | 0.0(5) | - |
| Wiping nose with a napkin | 90.9(33) | 90.9(11) | 62.5(64) | 100.0(6) | 66.7(27) | 100.0(13) | 80.0(20) | 100.0(13) |

Fig. 9A

| Parameter | Value |
|---|---|
| MCU Active Current | 7.2 mA |
| MCU Sleep Current | 3 µA |
| OV2640 RGB Cam Current | 36.7 mA |
| GridEYE IR Array Current | 4.5 mA |
| micro SD Write Current | 49.5 mA |
| micro SD Idle Current | 1.5 mA |
| Total System Average Power | 192 mW |
| Total System Peak Power | 294 mW |
| *Estimated Battery Lifetime (2500mAh)* | 17 hours |
| *Measured Battery Lifetime in-wild (1200mAh)* | 12 hours |

Fig. 10

METHOD AND SYSTEM FOR ACTIVITY DETECTION WITH OBFUSCATION

CROSS-REFERENCE TO RELATED APPLICATION

The present application is a Continuation application of U.S. patent application Ser. No. 17/010,560 filed on Sep. 2, 2020, which claims the priority benefit of U.S. Provisional Patent App. No. 62/895,290 filed on Sep. 3, 2019, the entire disclosures of which are incorporated by reference herein.

REFERENCE TO GOVERNMENT RIGHTS

This invention was made with government support under Grant No. DK113242 awarded by the National Institutes of Health and under Grant No. 1915847 awarded by the National Science Foundation. The government has certain rights in the invention.

BACKGROUND

Wearable egocentric cameras provide a way to unobtrusively record natural human and animal behaviors in the wild, including moment-by-moment details of how the environment, person/animal, and technology are connected. These cameras are especially helpful in the ubiquitous computing community, where they can be used as a reliable source of visual groundtruth. For example, automatic eating detection wearables can be configured to utilize non-visual signals and machine learning to detect eating episodes. In such implementations, researchers deploy the camera, and the wearable under test together, and then use recorded video with manual labels to determine the accuracy of the eating detecting non-vision wearable. For the past decade this approach has been used to validate numerous techniques for classifying behavior beyond eating such as watch usage, breathing, fluid intake, activity recognition of humans and animals, etc.

SUMMARY

An illustrative camera system includes a camera configured to capture first video of a scene in the form of first image frames. The camera system also includes an infrared sensor configured to capture second video of the scene in the form of second image frames. The system also includes a processor in communication with the camera and the infrared sensor. The processor is configured to obfuscate one or more portions of the scene.

An illustrative method of monitoring includes capturing, with a camera mounted to a camera system, first video of a scene in the form of first image frames. The method also includes capturing, with an infrared sensor that is also mounted to the camera system, second video of the scene in the form of second image frames. The method also includes analyzing, by a processor in communication with the camera and the infrared sensor, the second video captured by the infrared sensor to identify a foreground and a background of the scene. The method further includes obfuscating, by the processor and based on the identification of the foreground and the background, one or more portions of the scene to block sensitive imagery.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 6 depicts hit and miss percentages for various methods used to test obfuscation performance in accordance with an illustrative embodiment.

FIG. 9A depicts results of a second evaluation (to test the effect of obfuscation on automatic object detection) in accordance with an illustrative embodiment.

FIG. 10 depicts results of battery lifetime testing in accordance with an illustrative embodiment.

DETAILED DESCRIPTION

Figure 1A:
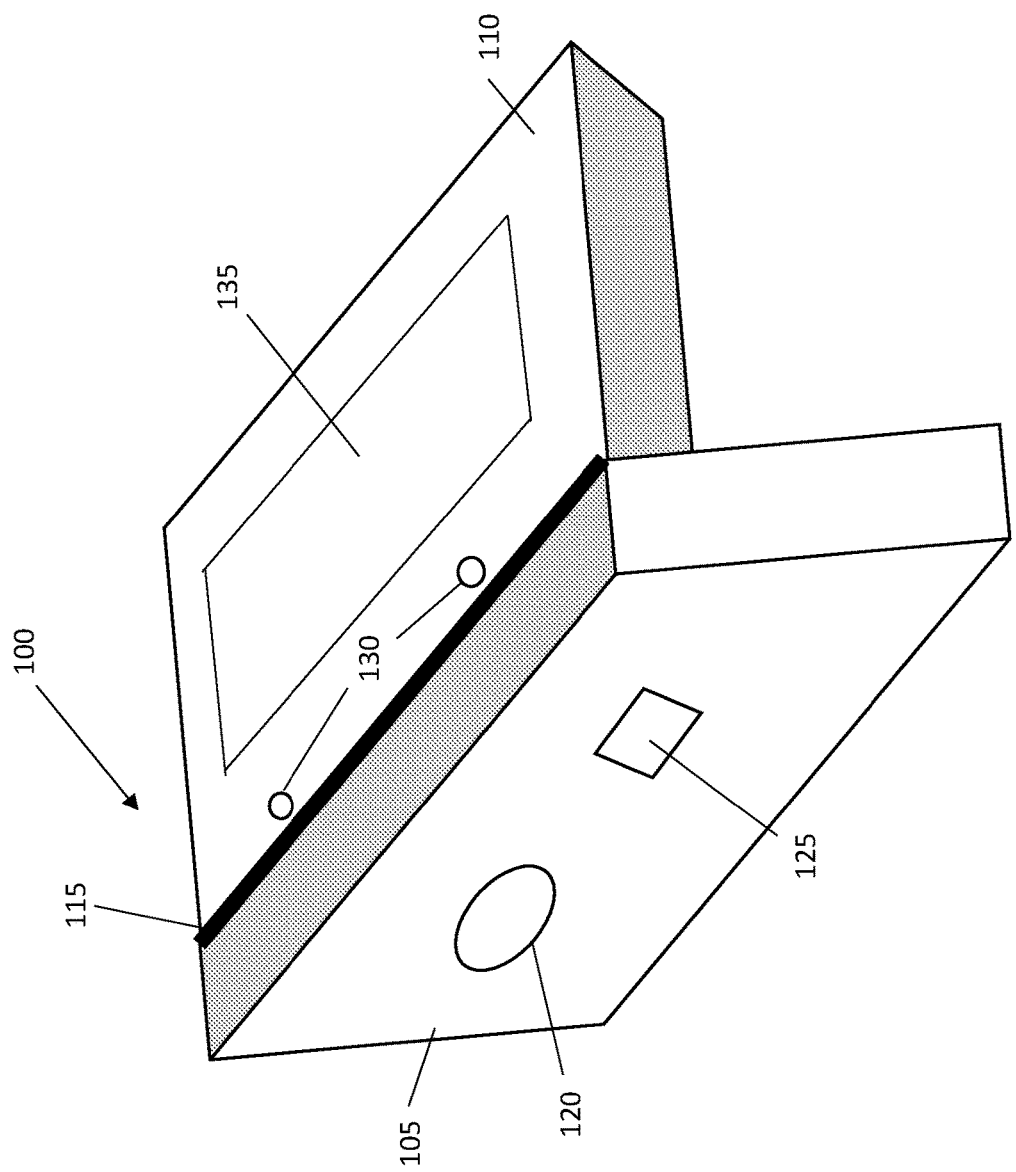
FIG. 1A depicts a prototype of a camera system with image obfuscation in accordance with an illustrative embodiment.

Cameras are becoming smaller and more capable, enabling capture of rich information in more diverse applications and environments. However, the concept of a battery operated all-day camera with continuous capture has not been fully realized, in part because of short battery lifetimes, lack of configurability, and privacy concerns. This type of video recorder could greatly assist in behavioral and medical research, especially for validating machine learning assisted sensing technology against actual human behaviors under consideration: such as eating, smoking, or interacting. Such an all-day battery operated camera could also be used in monitoring applications, remote wilderness sensing applications, surveillance, etc.

Studies demonstrate that cameras are a powerful source of groundtruth that is indispensable to ubiquitous computing and other monitoring applications. However, serious issues with current cameras prevent them from being widely deployed, and prevent validation of ubiquitous computing devices in longitudinal studies because of the lack of strong, information rich, unobtrusive groundtruth. The inventors have identified four major problems with current egocentric cameras that prevent their more general use: i) current cameras usually capture intermittent snapshots (photo-logs), instead of continuous video, ii) current cameras have short battery lifetimes preventing long-term in-wild day long observations, iii) current cameras have wearability issues sometimes stemming from a lack of adaptability to different body types, and iv) current cameras have a distinct lack of privacy, usually capturing (with a wide angle lens) friends, family, and unnecessary background information beyond the wearer activity or other object/activity of interest.

Described herein is a privacy-enhancing camera that solves the aforementioned problems with traditional cameras. The proposed camera has all-day battery life that enables continuous video capture of authentic human/animal behaviors, nature, etc. in a natural environment. In an illustrative embodiment, the privacy-enhancing camera can be in the form of a wearable camera. Alternatively, the camera can be mountable on a stand, tripod, tree mount, vehicle mount, etc. Thus, although many of the embodiments described herein are with respect to a wearable camera, it is to be understood that the proposed camera is not limited to a wearable device. In another illustrative embodiment, the camera is coupled with an offline privacy-enhancing image obfuscation pipeline, and a novel mechanical design that facilitates multiple use cases and accommodates various body types, mounting locations, etc. As discussed in more detail below, the proposed camera has been validated as an automatic eating detection system, and as an in-situ object and activity detector. Additionally, the proposed camera has been shown to have at least a 12 hour battery life, which supports all day wear/use.

More specifically, described herein is a camera system that enables end-to-end effortless and continuous collection of privacy enhanced video via a wearable/mountable camera with all day battery life and an intelligent, computationally efficient image obfuscation pipeline. In one embodiment, the camera system includes a low power 8×8 pixel infrared (IR) sensor array that is leveraged by the image obfuscation pipeline to enable energy-efficient foreground detection. Alternatively, a different size of infrared array may be used, such as 2×2, 4×4, 16×16, etc. In one embodiment, images/video are encrypted on the camera, provided to an offline image obfuscation pipeline, and then processed offline by the image obfuscation pipeline. Alternatively, the processing and obfuscation may be performed on the camera. The image obfuscation pipeline can be an end-to-end hardware/software system that removes privacy sensitive background information (e.g., bystanders, faces, etc.) from video while retaining important egocentric foreground activity of interest (e.g., eating episodes, drinking episodes, speaking, smoking, etc.).

FIG. 1A depicts a camera system 100 with image obfuscation in accordance with an illustrative embodiment. The camera system 100 includes a sensor portion 105 adjustably mounted to a mounting portion 110. The sensor portion 105 and the mounting portion 110 are connected via a hinge 115 in the depicted embodiment. In alternative embodiments, a hinge may not be used and the two components can be connected via any other movable connector that allows an angle of the sensor portion 105 to be adjusted relative to the mounting portion 110. The sensor portion 105 includes a camera 120. In an illustrative embodiment, the camera 120 can be a red-green-blue (RGB) camera with a fisheye lens. Alternatively, a different type of camera and/or lens may be used. The sensor portion 105 also includes in infrared (IR) sensor 125. In one embodiment, the infrared sensor 125 is an 8×8 pixel IR sensor array. Alternatively, the sensor portion may include a different size and/or type of IR sensor. The mounting portion 110 includes lanyard attachments 130 and a magnetic backplate 135 that enable the camera system 100 to be worn by a user and/or mounted to a stationary mount. In alternative embodiments, the mounting portion can additionally or alternatively include one or more threaded openings, clips, brackets, straps, fasteners, etc. such that the system can be mounted to a camera stand, tripod, user, etc.

Figure 1B:
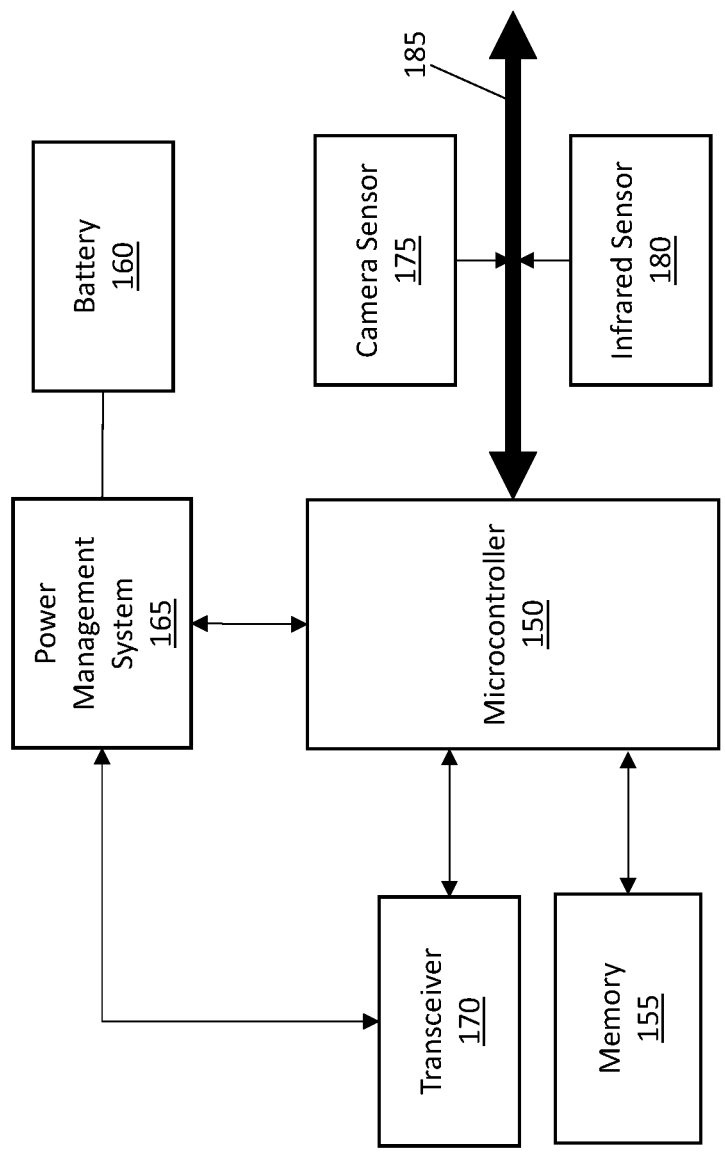
FIG. 1B depicts a block diagram of a camera system with image obfuscation in accordance with an illustrative embodiment.

FIG. 1B depicts a block diagram of a camera system with image obfuscation in accordance with an illustrative embodiment. In an illustrative embodiment, the camera system includes a dual-stream sensing video camera designed to run autonomously and record activities of a user and/or occurrences at a location. The camera system includes a microcontroller 150 which is configured to executed stored instructions to implement any of the camera system operations described herein. The microcontroller 150 can be one or more processing components, and can be any type of processor, microprocessor, controller, etc. known in the art. The microcontroller 150 is in communication with a memory 155 that is used to store operating instructions for execution by the microcontroller 150. The memory 155 can be any type of computer storage medium known in the art. The memory 155 can be removable or permanently installed, depending on the embodiment. The camera system can include a plurality of different memories in some embodiments. In addition to operating instructions, the memory 155 can be used to store programs, algorithms, captured video/images, etc. associated with the camera system.

In an illustrative embodiment, in addition to the memory 155, the microcontroller 150 can include an internal buffer that is designed to store captured data from the sensors of the system. When the internal buffer becomes full, the microcontroller 150 can move the stored data from the internal buffer to the memory 155. As discussed herein, such buffering reduces the amount of interaction with the memory 155 and results in less energy usage for the system.

The camera system of FIG. 1B includes a battery 160 and a power management system 165. The battery 160 has a charging port that is configured receive electrical power for charging the battery. The charging port can be configured as a universal serial bus (USB) port, as a wall outlet receptacle port, a wireless charging port, etc. The power management system 165 is designed to intelligently distribute power from the battery to the microcontroller 150 and other components of the system such as a transceiver 170 and the sensors. More specifically, the power management sub-system 165, which can include software and/or hardware, is used to control power usage, battery conservation, and charging of the camera system battery 160. In an illustrative embodiment, the battery is configured to last through a full day (e.g., 12+ hours) of continuous use such that the user is able to monitor activities over a long period of time.

The transceiver 170 can include a transmitter and/or a receiver, and can be used to communicate with other systems such as an offline image processing system, a remote image storage system, a user device, an administrator device for programming and updates, etc. The camera sensor 175 can be an RGB camera as described herein, and the infrared sensor 180 can be an infrared sensor array. The camera sensor 175 and the infrared sensor 180 are in communication with the microcontroller 150 via a bus 185. The bus 185 (or a different bus) can similarly be used to connect any of the components of the camera system to one another. In one embodiment, the camera sensor 175 can be a OmniVision OV2640 RGB camera, the IR sensor 180 can be a Panasonic GridEye 8×8 IR Array, and the microcontroller 150 can be an ARM-Cortex M4 microcontroller. In alternative embodiments, different types of camera(s), sensor(s), and/or processor(s) may be used in the system.

In some embodiments, the proposed camera system can be in the form of a custom hardware prototype groundtruth collector device that records RGB and 8×8 (or other) IR video continuously. Users can attach the collecting device using one of a plurality of different methods. In one embodiment, a magnetic backplate of the collector device detaches and can be put behind a user's shirt such that the magnet secures the device on the shirt itself. Alternatively, the user can use a lanyard to secure the device around a neck of the user. A pin, strap, or other mounting technique can alternatively be used in other embodiments. In other embodiments the device may not be mounted to a user, and can instead be mounted to a stand, tripod, tree, building, etc. to monitor an area. The device can be adjustable to fit the body type of the wearer, the activity of interest, specialized mounts, etc. With storage and battery life for all-day recording in a small package, the collector device enables less-burdensome capture of authentic human behavior.

The proposed camera system can also include a privacy enhancing video obfuscation pipeline, which uses the information gathered by the IR array sensor to separate foreground and background of the scene. The foreground may be the hand-to-head (or other monitored) activity and the background typically contains the scene and potentially private/sensitive information. In some embodiments, the camera system gathers raw video and IR data streams at five frames-per-second, encrypts these streams on the fly using a stream cipher or other technique, and stores the images in the memory (e.g., a microSD card). In such an embodiment, the obfuscation can occur offline. Alternatively, instead of storing encrypted data, the obfuscation can be performed by the on-board processor in real time. In such an embodiment, encryption may not be performed and/or the video data may not be stored locally on the system.

Detecting foreground using a single depth-less RGB camera can be difficult, and may involve computations beyond what is usually practical in small wearable devices. Additionally, supporting a depth sensor in a camera is very energy-intensive. The inventors surveyed the available depth sensing devices to choose something low power enough to run continuously in a wearable, while still providing enough information to enable distinguishing foreground from background scene. It was determined that existing high resolution stereo depth cameras, like Intel RealSense, use three orders of magnitude more energy than what is in the wearable range (single digit milli-amperes). Based on this research, the inventors evaluated use of an infrared array (e.g., Panasonic Grid-EYE infrared Array—AMG8833), which can be can 8×8 infrared (thermopile) array. Alternatively, a different sized array may be used. Each of the 64 pixels in the infrared array can provide independent temperature readings, and the 8×8 infrared array resembles a very low-powered low-resolution thermal camera. As such, the IR array is a useful approximation to high powered stereo depth cameras which easily interpret foreground, as well as detect human movement. In an illustrative embodiment, both the IR and the RGB cameras share the same field of view (FOV), providing a way to extract foreground activity.

The proposed camera system utilizes a variety of techniques in software and hardware to achieve low power operation and meet an all-day battery life goal. Additionally, in some embodiments, only the minimal components needed to accomplish video recording and obfuscation are incorporated into the system. By removing any user interface, or extraneous sensing like audio, the energy-efficiency was dramatically increased compared with comparable devices (e.g., the GoPro has a 1-3 hour battery lifetime). In alternative embodiments, the system may support a display or other user interface, audio, light(s), etc. The power was also reduced by enabling reduced video resolution (e.g., 320×240), as high definition (HD) video is not always needed for recognizing activities. To reduce the load on the memory of the camera system (which can be an SD card in some embodiments), which is the highest power component next to the camera(s), frames can be batched in an internal memory space of the processor, and then stored to the memory card once that buffer is filled.

In some embodiments, the RGB camera is configured to output Joint Photographic Experts Group (JPEG) images over a Digital Camera Interface (DCMI). Additionally, the camera can be controlled to operate at a resolution of 320×240 pixels, which is enough to recognize fine-grained activities in most usage scenarios. The video can be captured at five frames per second, which has been found to be a good tradeoff point to save battery while also being able to catch any activities in view. Alternatively, a different resolution and/or capture rate may be used. A 180 degree fish-eye (or other wide angle) lens was mounted to the camera to increase the field of view, on a M12 mount (allowing for any type of lens). A wide-angle (fish-eye) lens allows for broader activity detection. In an illustrative embodiment, the camera sensor and the IR sensor have the same field of view. In alternative embodiments, the IR sensor may have a narrower field of view (compared to the camera sensor) that is focused in the upper portion (facing the user) of the camera sensor view. This narrower field focuses the IR sensor such that it better captures hand movements and foreground action which can be interpreted by the obfuscation pipeline.

The mechanical design of the hardware factors into both the flexibility (in terms of deployment ability) and usability (in terms of ruggedness and comfort) of the platform. The printed circuit board (PCB) of the system can be enclosed in a different compartment than the battery in some embodiments, which allows one to distribute the weight of the device. The system can also include a hinge between system components that will allow for angle adjustment, depending on location and body type. The hinge can be fixed firmly using a screw or other fastener. The device can be attached to the human body using the magnetic back-plate, pin, lanyard, etc. In some embodiments, the weight of the entire system, including the high capacity battery and enclosure, can be approximately 183 grams/6.45 ounces.

Figure 2:
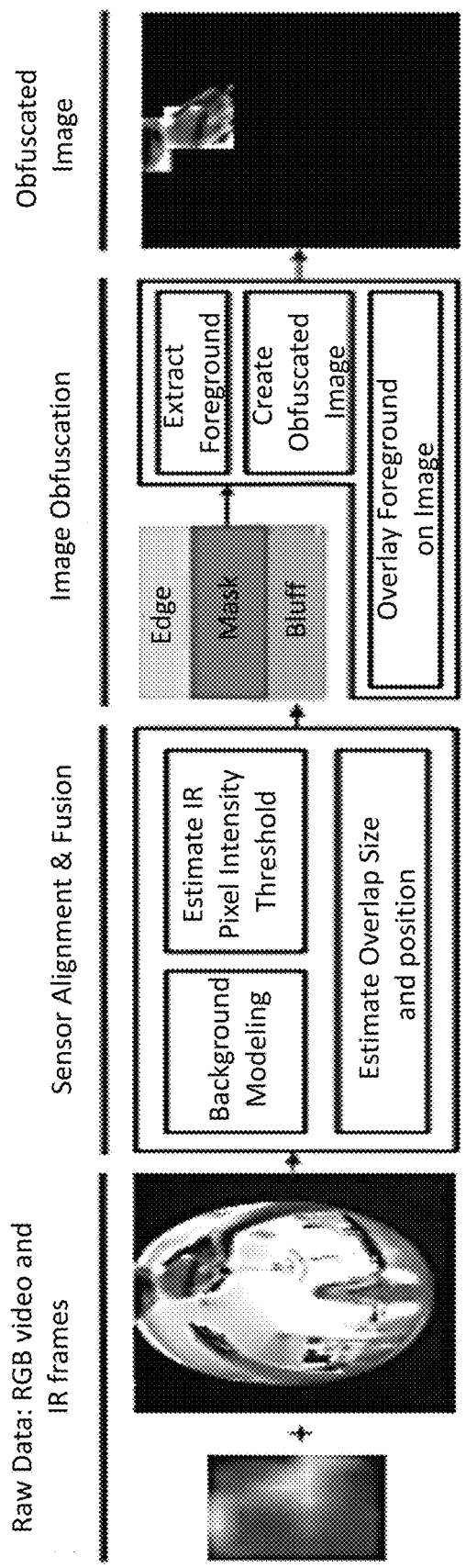
FIG. 2 depicts an image obfuscation pipeline process in accordance with an illustrative embodiment.

FIG. 2 depicts an image obfuscation pipeline process in accordance with an illustrative embodiment. The process includes aligning IR frames with the RGB frames to delineate the foreground from background, and generating new privacy enhancing images in which one or more portions of the background and/or foreground are obfuscated. In some embodiments, after the cameras capture IR and RGB frames, the image obfuscation pipeline performs (1) sensor alignment and fusion, (2) and image obfuscation. The sensor alignment and fusion involves background modeling, estimation of IR pixel intensity thresholds, and estimation of overlap size and position. The image obfuscation involves extraction of the foreground, creation of an obfuscated image using one or more obfuscation techniques (blur, mask, edge, in-painting, abstraction, etc.), and overlaying of the foreground onto the obfuscated image. This pipeline provides users with the ability to use various obfuscation techniques on objects in the background, while enabling viewing of an activity, etc. in the foreground of the image.

Alternatively, one or more portions of the foreground may be obfuscated and/or one or more portions of the background can be included in the final, obfuscated image. A cross-platform tool can also be provided that helps in visualizing the IR and the RGB frames to confirm the sensor alignment and fusion with the RGB frame, choose the filter used for obfuscation technique(s), and delete any unwanted segments.

In some embodiments, the IR sensor array and the RGB camera capture different fields of view with different resolutions. The IR sensor array can be mapped to the RGB 320×240 frame using a series of linear transformation functions. As an example, the IR sensor array can be up sampled using a Gaussian kernel (e.g., resulting in size of 150×150), and the IR frame can then be mapped onto a fixed location in the RGB frame. The location may slightly vary depending on the user. In one study, 8 participants (4 females and 4 males) were asked to wear the camera system, and the sensor frames were manually aligned to the RGB frames after up sampling them. The average position of the top left corner of the IR frame was (x=110.9, y=45.7) with a standard deviation of (x=4.1 and y=6.6) pixels.

Determining an intensity threshold for the pixels in the IR frame provided by the array is important to extract items of interest in the images (e.g., the wearer's hand and head in the foreground) so that the obfuscation method can be applied on the rest of the image (background). This threshold is variable as the IR is sensitive to ambient temperature in a scene, and can therefore change in different scenes (e.g., going from indoor to outdoor or vice versa). To estimate the initial threshold, one can utilize an automated approach or a manual approach.

Figure 3:
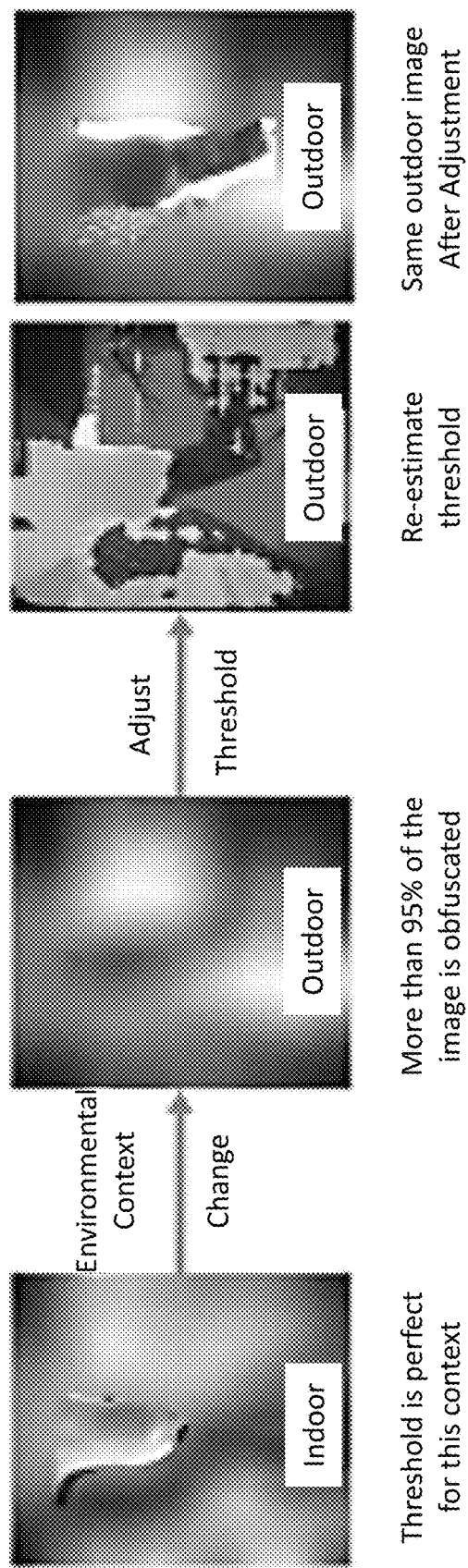
FIG. 3 depicts an automated approach to estimate an initial intensity threshold for pixels in the IR frames in accordance with an illustrative embodiment.
Figure 4:
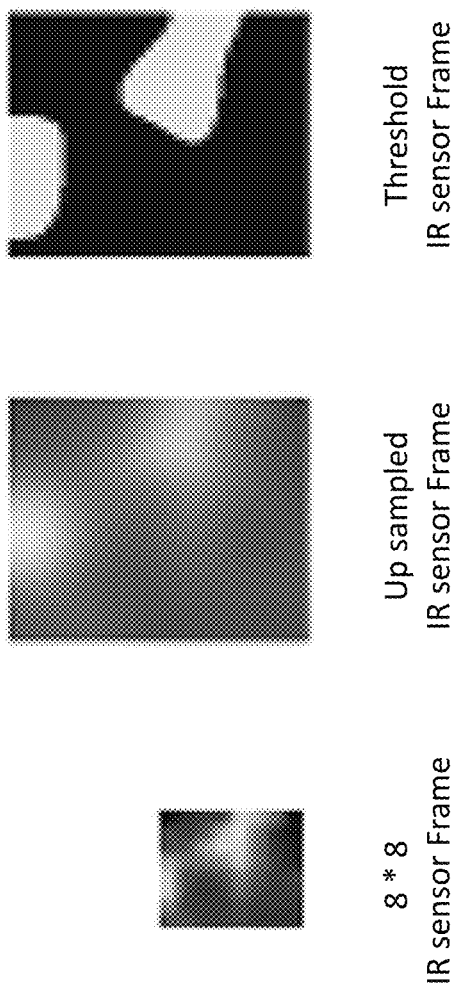
FIG. 4 depicts use of an IR sensor mask in accordance with an illustrative embodiment.

FIG. 3 depicts an automated approach to estimate an initial intensity threshold for pixels in the IR frames in accordance with an illustrative embodiment. The automated approach involves detection of pixels related to the wearer's face using a semantic segmentation method (e.g., DeeplabV3 with MobileNet-V2 network) along with extraction of the thermal values that overlap with the detected wearer pixels. The maximum thermal value can be considered as the threshold. Alternatively, a value (e.g., 2) can be added to the maximum value to be more conservative. When the ambient temperature in the scene changes, the IR threshold should be recalculated with the same method. The ambient temperature can be monitored by the IR array or by a separate temperature sensor mounted to the camera system. In some embodiments, the IR threshold is only recalculated upon detected changes to conserve power. A change in the scene can either produce an image that is highly obfuscated (95% obfuscation or greater) or barely obfuscated (5% obfuscation or less). The IR sensor threshold is then used to generate an IR sensor mask. FIG. 4 depicts use of an IR sensor mask in accordance with an illustrative embodiment. The lighter areas in FIG. 4 correspond to foreground, and dark areas correspond to background.

To detect the background in an image, the foreground can be segmented from the image. In one embodiment involving monitoring of hand-to-head activity, since a head of the user may stay roughly within the same region of the image, the system can focus on detecting the moving hands of the user (based on the known information that the user's head often stays roughly within the same region) to segment out the foreground of interest. To capture hand motion, motion contours can be segmented out using a Gaussian Mixture-based foreground segmentation algorithm. The approach models each pixel using a mixture of K Gaussian distributions (K=5, set empirically), and the weights of the Gaussian distributions represent the proportion of time the same pixel colors were present. Higher weighted pixels are identified as background. Other parameters of this algorithm include background ratio (e.g., 0.5), history (e.g., 200), and learning rate (e.g., 0.2). When the hand enters the field of view of the IR sensor, several motion contours can be identified in the camera image, based on the premise that at-least one of them is a moving hand. Alternatively, other methods can be used to capture the hand motion. Once alignment of the camera frame and IR sensor frame is complete, the final combined image can be created with each obfuscation method applied.

Figure 5:
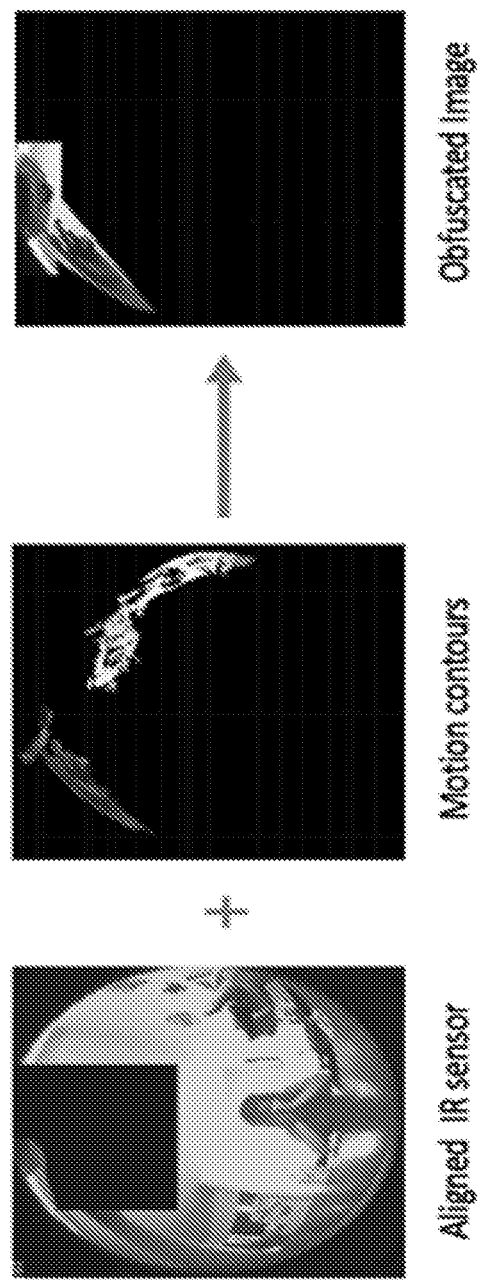
FIG. 5 shows an example of extracting the foreground from an alignment infrared (IR)ss sensor and the motion contour in accordance with an illustrative embodiment.

While the IR sensor frame helps to determine the foreground pixels, given the coarse 8×8 representation, it does not accurately segment the foreground objects. Therefore, all pixels that overlap with the IR mask as well as the convex hull of the motion contour were considered to be foreground if the overlap was at least 15%. Alternatively, a different percentage may be used such as 10%, 12%, 17%, 20%, etc. FIG. 5 shows an example of extracting the foreground from the alignment IR sensor and the motion contour in accordance with an illustrative embodiment. More specifically, FIG. 5 shows how an aligned IR sensor mask and motion contours are used to create the obfuscated image when there is overlap.

In some embodiments, the obfuscation method is applied on all pixels at first and then the non-obfuscated foreground is overlaid. Any obfuscation method(s) can be incorporated into the hardware/software of the pipeline system. For example, obfuscation methods that can be used include mask (set pixels to zero), blur (a normalized box filter applied to the entire image), edge (Canny's technique to detect edges), etc. The foreground segments can then be overlaid onto the obfuscated image. The overlaying can be done by reassigning the pixels in the foreground segments to be the same RGB value as in the original image.

The proposed camera system was evaluated through measurement and comparison using images captured in-wild and in-lab from multiple subjects. As discussed in more detail below, it was found that the camera system (including the obfuscation pipeline) outperforms off-the-shelf methods by leveraging the IR array in enhancing bystander privacy. The obfuscation pipeline system preserves enough information to label most activities, but the accuracy of labeling is highly dependent on the activity. It was also confirmed that the proposed system has all day battery life, as confirmed by testing and multiple wearers.

Described below is an evaluation of (1) the accuracy of the obfuscation pipeline leveraging the IR array in removing bystanders from a captured image, and (2) the robustness of the pipeline when faced with the numerous potential confounding behaviors encountered when worn in-wild. The first evaluation utilizes 10 short scenarios captured by the camera where a bystander is in frame. Each scenario is considered privacy sensitive, as in a bystander has expressed concern about being captured on camera (for example, smoking, using the toilet, etc.). The evaluation shows that using the IR array is superior to using RGB video alone for egocentric bystander obfuscation. A second evaluation utilizes 9 hours of data collected in the wild to test the robustness of the pipeline in obfuscating bystanders in a real-word setting, including commuting, working in a public place, and eating. The results show that for many daily activities obfuscation works well, however the method can be sensitive to positioning of the camera system (for example when the wearer has loose clothing which gets caught and pulls the camera system away from wearer). This is because in some embodiments the IR array should be able to see the wearer's chin and hand movement to enable obfuscation. In all evaluations, images were captured in-wild and obfuscated offline, preserving groundtruth for comparison. Alternatively, the obfuscation can occur in real time on the camera system.

In one test, the ability of the proposed camera system was compared to off-the-shelf state of the art methods for detecting humans (bystanders). The camera system was used to collect 10 scenarios where the wearer is performing an activity around bystanders whom are performing activities of their own, and that could potentially be considered concerning if captured on camera. The combination of the wearer/bystander activities are the following in each scenario (V): (V1) Typing/Eating, (V2) Eating/Talking, (V3) Wearing Glasses/lying down (Sick), (V4) Washing hands/Sitting on the toilet (Toilet), (V5) Talking/Smoking, (V6) Drinking/Crying, (V7) Scratching/Drinking, (V8) Bite nails/Fighting, (V9) Calling/Exercising, and (V10) Yawning/Praying. Of the collected frames, 851 frames contained bystanders. A groundtruth was obtained by manually labeling the bystander head in each frame, as this can be considered to be the minimum privacy required to obfuscate the bystander.

Four off-the-shelf state of the art methods for detecting humans were selected and compared to the proposed camera system. The models used were pre-trained with existing datasets that contain a 'person' class such as COCO, PASCAL VOC 2012, and Cityscapes. Two methods were used to detect a human: person pixel segmentation and person region of interest detection. In alternative embodiments, different methods may be used. Person pixel segmentation was performed using Deeplabv3+ with the Xception network and MobileNet-V2 network. Again, in alternative tests, different segmentation methods can be used. For person region of interest detection, the object detection algorithm YOLOv3 was used. Models were run on each frame, and each pixel was labeled as 1 if it was classified as a person and 0 otherwise.

A quantitative per-pixel metric was defined for comparing obfuscation ability across various techniques/systems. The obfuscation success was measured based on each frame where at least the human head was obfuscated, since this is the minimum privacy requirement for an obfuscation method aimed at enhancing bystander privacy. In alternative embodiments, different privacy requirements can be used, resulting in potentially different obfuscation in the images.

Comparisons were conducted per frame, and two types of pixels in an image frame were defined: groundtruth (GT) pixels, which are pixel wise labels of the bystander (e.g., 1 for pixels that contain the bystander head and 0 otherwise); and obfuscated pixels (OP), which are pixel wise labels of the obfuscated bystander obtained from the method under test (1 for pixels that contain an obfuscated bystander head and 0 otherwise).

Overlap was also defined, as shown in Equation 1, where the intersection of GT and OP forms the numerator of the Jacquard coefficient. The intersection is not being divided over the union because false positives did not matter in the testing being conducted. However, it was desirable to obtain a percentage of the overlap for comparisons, so the number of bystander pixels found in the intersection was divided by the number of bystander pixels found in the groundtruth, and the groundtruth was set with a manual polygon annotation of the bystander head in each frame.

$$\text{Overlap} = \frac{\sum (GT \cap OP)}{\sum GT} = \frac{\text{\# of bystander pixels in intersection}}{\text{\# of bystander pixels in groundtruth}} \quad \text{Eq. 1}$$

If the overlap was larger than 0.5, the bystander obfuscation was considered to be successful in the frame under test, for the method under test. The number of successful obfuscations was counted and divided by the total number of frames to obtain the hit and miss percentage. FIG. 6 depicts hit and miss percentages for various methods used to test obfuscation performance in accordance with an illustrative embodiment. The bystander obfuscation results show that off-the-shelf state of the art methods in human detection fail at detecting bystanders in some of the frames, while the proposed camera system approach leveraging the IR array was able to successfully obfuscate. The number of image frames are shown in parentheses beside each scenario tested.

Thus, the proposed hardware-software approach of the proposed camera system obfuscates bystanders better than general off the shelf models that can predict a person class. This is in part because the proposed system does not rely on the RGB pixel values to determine if there is a bystander or not, but instead relies in part on the infrared sensor information to identify the segment related to the wearer and obfuscate everything, regardless of if there is a bystander or not. Alternative configurations can be used in different embodiments, such as only obfuscating certain objects.

The general purpose models can be useful in many other domains, especially when multiple objects other than a person are to be detected. However, they have limitations in detecting bystanders in video collected in the wild. Neural network models perform well in obfuscating bystanders when the whole bystander body is visible in the frame, face forward, with no obstruction, and low movement—such as scenario (V5) in the testing. In other cases such as V1, V2, V6 and V9, neural network models missed frames where the face was not clear—for example, when the person was walking away from the camera, his/her head was looking down, or when an object obstructed part of the body. In some cases off-the-shelf models fail to detect the bystander in all frames, such as scenarios V4 and V7. These are an example of out-of-distribution cases that were not contained in the training dataset. This problem is not particular to the case of images obtained from wearable cameras as other researchers have shown general limitations of neural networks in handling out-of-distribution data both in the adversarial and non-adversarial case. This problem could potentially be mitigated by taking into consideration previous frames and implementing tracking to reduce sporadic failing cases for neural network methods. However, the proposed hardware-software approach can obfuscate without tracking.

Figure 7:
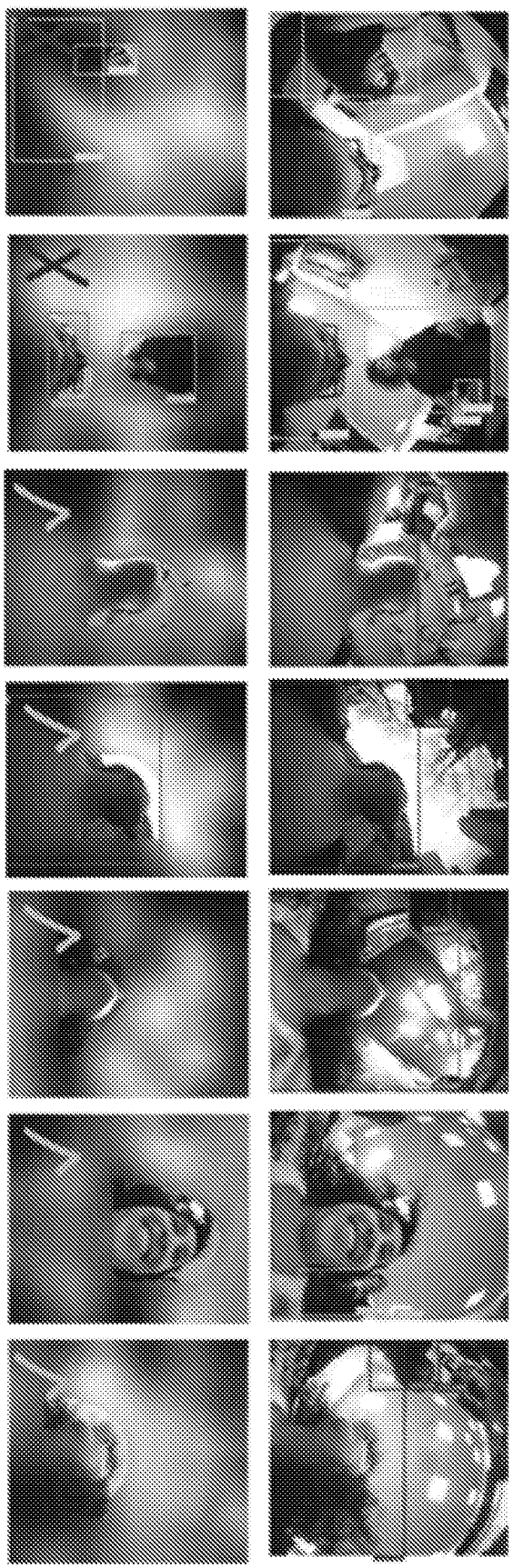
FIG. 7 depicts examples of successful and unsuccessful obfuscation in accordance with an illustrative embodiment.

Robustness of bystander obfuscation was also studied. An analysis was performed to study the fragility of the obfuscation pipeline system to daily life events and wear that could potentially confound obfuscation. Two individuals wore the proposed camera system for a total of 9 hours in the wild in an urban city located in the USA in a major population center. They were encouraged to be around bystanders while doing activities of everyday living such as commuting, eating, and working. Bystanders were present in 6.42 hours of video total. The participants did not need to charge the camera system. The YOLOv3 algorithm was used offline to automatically detect people in the obfuscated, and non-obfuscated (original) frames. Very few bystanders were detected by YOLOv3, which indicates that the system properly obfuscated detected bystanders. In cases in which bystanders were detected, it was often the case that abnormal positioning of the camera was to blame (e.g., loose covering partially covering the lens, etc.). FIG. 7 depicts examples of successful and unsuccessful obfuscation in accordance with an illustrative embodiment. Specifically, in FIG. 7, the bottom row depicts captured images, and the top row depicts successfully obfuscated versions of the captured images (check marks) and unsuccessfully obfuscated versions of the captured images (x marks).

Two evaluations were also conducted to test the utility of the information preserved by the obfuscation pipeline system (i.e., the utility as measured for labeling or inferring human activities and object usage from video data, where labels are created by humans or machines). These labels provide the most concrete groundtruth for verifying sensor based inference or self-reports. The first evaluation utilizes 7 of the 10 scenarios depicted in FIG. 6. In this experiment, human labelers were asked to label the bystander and wearer activity in the obfuscated and non-obfuscated video. The second evaluation utilized an in-lab dataset of 6.6 hours that included 8 participants (4 female and 4 male) manipulating objects and conducting activities with the objects while wearing the camera system. Off the shelf methods for activity recognition were used on the obfuscated and non-obfuscated frames, to demonstrate that information is preserved for machine labeling. In both evaluations human and machine labeling performed well, recognizing activities even though the frames were obfuscated, as compared to the non-obfuscated case.

As discussed above, the first evaluation was with respect to the effectiveness of groundtruth preservation for human labeling. The proposed camera system was tested to determine whether image groundtruth utility was preserved for human viewers after obfuscating the image frames. The utility for humans viewers is important because current supervised machine learning algorithms rely on labels obtained from humans. For purposes of the evaluation, it was determined that obfuscated images obtained from the camera system maintain groundtruth utility if a human viewer can label the wearer activity with an accuracy that is non-inferior to the accuracy obtained from the same videos but with no obfuscation. To calculate non-inferiority, the two one-sided test (TOST) was used. Participants were broken into two groups, one that viewed the obfuscated video generated from the camera system and another group (control group) that viewed the video with no obfuscation.

Figures 8A, 8B:
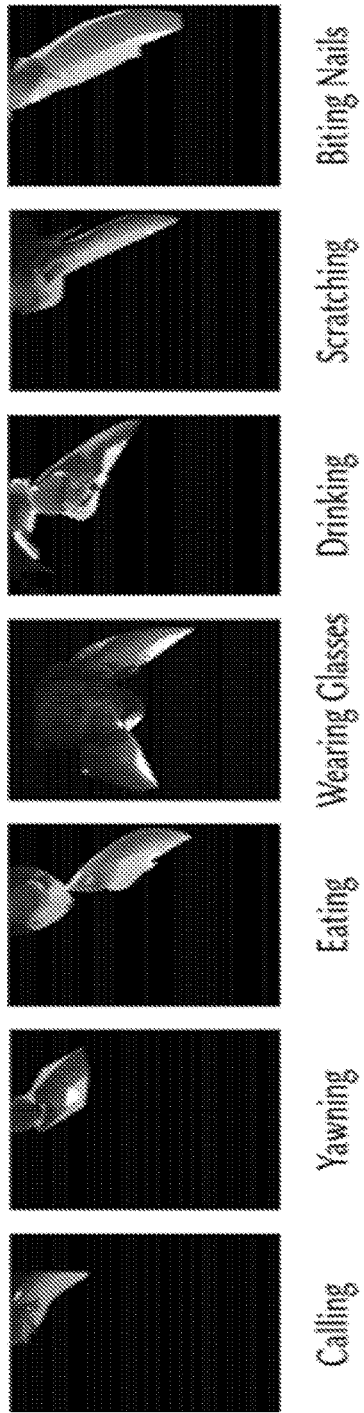
FIG. 8A depicts obfuscated images corresponding to 7 hand-to-mouth gestures in accordance with an illustrative embodiment.
FIG. 8B depicts results of a first evaluation (to test the effect of obfuscation on human labeling) in accordance with an illustrative embodiment.

Participants were asked to watch 7 videos that involved hand-to-mouth gestures described herein with reference to FIG. 6 (i.e., V2, V3, V6, V7, V8, V9 and V10). FIG. 8A depicts obfuscated images corresponding to 7 hand-to-mouth gestures in accordance with an illustrative embodiment. Participants were asked about the wearer activity in an open text format so that their response was not influenced. If the activity was labeled correctly, a score value of 1 was assigned to it and 0 was assigned otherwise. The evaluation included 60 participants (30 of which were in the control group that viewed the video with no obfuscation).

Still referring to the first evaluation, participants who viewed the obfuscated videos were able to correctly classify the wearer 70% of the time which was worse, but not significantly inferior to label accuracy obtained from the control group who viewed the videos with no obfuscation (81%). FIG. 8B depicts results of the first evaluation (to test the effect of obfuscation on human labeling) in accordance with an illustrative embodiment. Upon investigating each activity, it was noted that the difference in percentages resulted from activities such as eating using a transparent spoon (which can be hard to see), or activities that contain a gesture that needs more context, such as yawning, which was confused with eating by hand. Additionally, masking was used, which is an extreme obfuscation method (as opposed to blurring) that removes all scene context, and it is believed that the use of masking also contributed to the difference in accuracy. It was also determined that more contextual information can be preserved using a less extreme obfuscation filter (e.g., blur).

The second evaluation tested the effect of obfuscation on automatic object detection. Video of 5 activities was collected from 8 people (4 female and 4 male)) in order to test how obfuscation can impact automatic object detection. The activities performed were: drinking hot tea, drinking water, eating a banana, making a phone call, and wiping of the nose. These activities were chosen because they all have a similar gesture (hand-to-head) and include an object in hand. An object detection model was applied on both the obfuscated and the non-obfuscated video frames in order to assess the effect of the obfuscation on object recognition accuracy. The algorithm YOLO3 was again used to detect the objects in the wearer's hand. The YOLO3 algorithm is an off the shelf version trained on the COCO dataset. A customized version of the algorithm was also used, and was trained with the objects that the participants used during the recorded activities. Samples of the object images were obtained from the non-obfuscated images in order to treat object-detection in the non-obfuscated images as groundtruth.

FIG. 9A depicts results of the second evaluation (to test the effect of obfuscation on automatic object detection) in accordance with an illustrative embodiment. In FIG. 9A, blank entries indicate that the object was not detected in the original non-obfuscated frame. Overall, it can be seen that the obfuscation pipeline system does a good job of preserving information about objects that have similar temperature to the human body or above (like hot tea) but worse when the item is colder (chilled water), due to the reliance of the pipeline on the IR data. In the testing, a simple 1-bound threshold method was applied on the IR array input, which may result in the discrepancy between preservation of hot and cold objects. In alternative embodiments, a more complex algorithm can be used to determine an upper and a lower bound for a threshold which is able to better capture cold objects. It has also been observed that the position of the camera can impact the information preserved, as in the example of eating a banana.

Figure 9B:
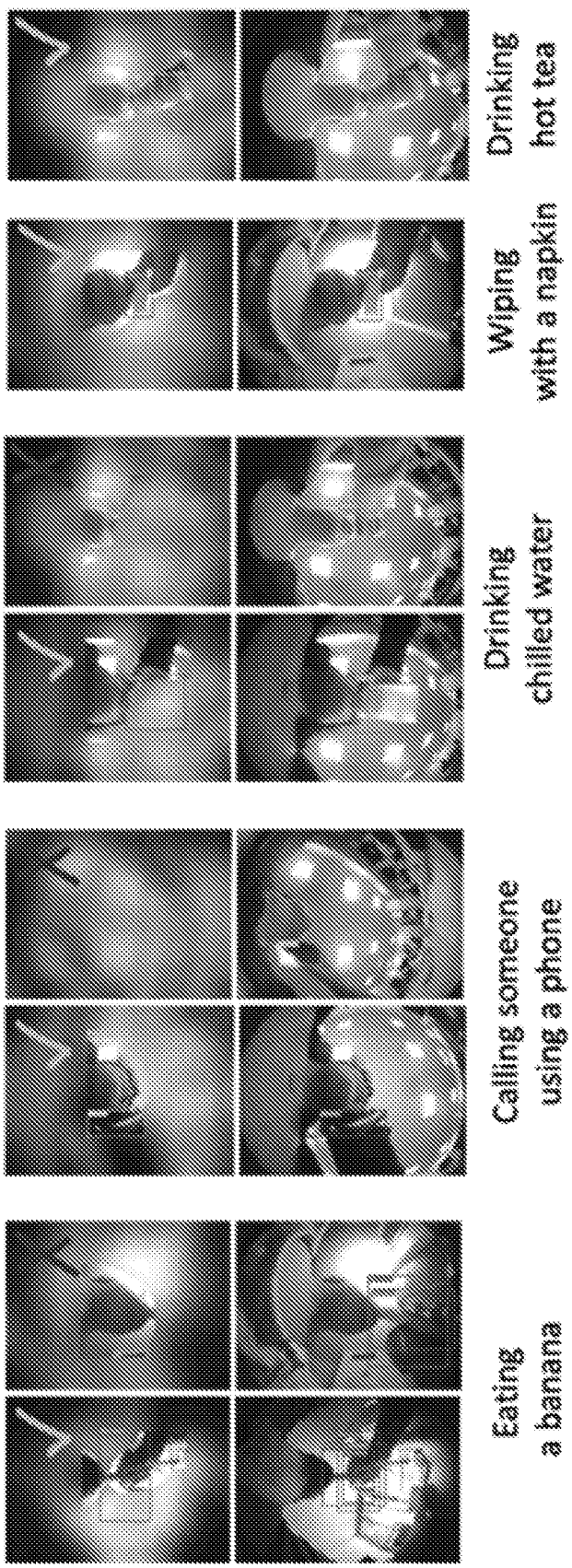
FIG. 9B shows examples of various activities monitored in the second evaluation in accordance with an illustrative embodiment.

FIG. 9B shows examples of various activities monitored in the second evaluation in accordance with an illustrative embodiment. Specifically, FIG. 9B shows cases where the obfuscation of the camera system successfully preserved information that can be utilized by automatic object detection models (check marks), and also failure cases in which the hand holding the object is out of the IR field of view (e.g., holding the object from the bottom end) or due to holding an object that has significantly lower temperature than the hand.

Analysis and measurement was also performed to test the power consumption and battery lifetime of the camera system. The static and dynamic power consumption states of the prototype were measured and used to make an estimate of battery lifetime using a 2500 mAh LiPo battery (51 mm×65 mm×8 mm) embedded in an insert slot of the magnetic backplate of the system. Alternatively, a different battery can be used and/or the battery can be mounted in a different location of the camera system. To provide a realistic assessment of battery lifetime, the in-wild wear time was evaluated over three participants who wore the prototype in their daily life commuting, eating, and relaxing in an urban city located in the US in a major population center. Overall, it was found that the estimates and actual measured lifetime support all day wear even with a half size 1200 mAh battery (12 hours in-wild) instead of the higher capacity 2500 mAh, meaning that the system can be made lighter and more compact than the prototype used for testing.

Three separate measurement devices were used to determine average and peak power draw of the camera system, operating at 3.0V: a Rigol DP832A Digital Power Supply, a Fluke 87V Multimeter, and an STElectronics Nucelo-LPM01A Power Shield. All three measurement devices concurred with the results. FIG. 10 depicts results of the battery lifetime testing in accordance with an illustrative embodiment. From this analysis, the experimental data suggests that the prototype device can last for 17 hours. The battery life was estimated based on the capacity of the battery measured in milliampere hours (mAh). An Ampere is an electrical unit used to measure the current flow towards a load. The battery life or capacity can be calculated from the input current rating of the battery and the load current of the prototype device, which was measured.

The battery life estimate assumes a fully charged battery, that has not been damaged, and that is actually at the rated capacity. It was further assumed that only 70% of the capacity is usable, which is a conservative way to estimate battery lifetime, as environmental factors like temperature and issues like wear and number of recharge cycles can influence the actual lifetime. The estimate was also based on the amount of power each component of the system is stated to use, according to device datasheets. As with any estimation of battery life, actual in-wild results will vary.

Beyond estimation, the prototype was tested in-wild to understand how the battery lifetime and energy consumption may change, and to verify the operation of the system in-wild. To reduce testing burden, a 1200 mAh battery (half-sized) was used, meaning that the potential battery lifetime with the full size battery would be twice as long. The system was used by three participants who wore the camera in-wild and went about their daily life activities during a weekday in an urban environment. Each participant started the day off with a fully charged camera system, and were asked to not charge the device or take it off. The participants wore the devices for 2.55, 6.45, and 12.0 hours, with the length of time dependent upon the scheduling logistics of the participants. In none of the test cases did the battery ever die, meaning that beyond a 12 hour lifetime is feasible in-wild.

The data captured during the testing was verified by examining the frame rate of the collected video and the size of the images, and by comparing the timestamps of the video captured on the memory. For the 12.0 hour wearer, the total number of frames collected in the single use was 224,225 with an effective frame rate of 5.19 frames-per-second overall, and a total memory footprint of 1.675 GB. These results confirm that camera system, even when using the half-sized battery, provides all-day battery lifetime in-wild.

It was also found during battery testing that there is variance in power consumption. The firmware used is deterministic as it continuously gathers image frames, encrypts the image frames, and stores the frames to the memory. As discussed above, in alternative embodiments, the encryption may not be performed if the obfuscation is performed in real time. The image sensor and IR array sensor have constant power draw, so the main variability in battery lifetime comes from manufacturing tolerances in batteries themselves, and the use of the memory and the size of the compressed JPEG image frame captured (dense scenes with movement have higher image memory size while blank backgrounds are readily compressible and have lower memory size). The 12.0 hours of in-wild data from the camera was characterized and it was determined that the minimum image size was 2.44 KB, the maximum image size was 9.69 KB, and the mean image size was 7.47 KB, with a standard deviation of 0.837 KB. The variance in saving to an SD card (memory) and image sizes did not appear to have an effect on the in-wild system battery lifetime.

As discussed above, it is believed that the proposed camera system is the first end-to-end platform for privacy enhanced video collection for groundtruth validation of human behavior studies and other monitoring applications. Discussed below are additional techniques that can be used to obtain groundtruth data, depending on the granularity of information needed. In some embodiments, one or more of these techniques can be incorporated into the proposed camera system or used in conjunction with the proposed camera system.

As one example, self-report methods using diaries have been used to report start and end times of activities. Self-reporting methods are usually used when there is minimal information to report as it is affected by recall bias and burden. Others have used machine learning algorithms in order to help create automatic diaries that allow users to confirm or correct the predicted activities. This reduces the burden on the user and has the potential to reduce recall bias. Others have used traditional observation methods where a researcher follows a participant and notes their activities. This method can work if the activity is to be observed for a short period of time or if the activity does not need fine grained groundtruth. However, when a longer observation is needed (e.g., beyond three or four hours), traditional observation methods can become infeasible.

Vision sensor networks such as surveillance camera systems, TrustEye and TrustCam can also be used for groundtruth data collection. These systems separate the physical layer from the utility and post recording processing. The physical layer integrates a transformation that masks, blurs, or applies edge as the video is being recorded. However, unlike the current system, such visual sensor networks are not designed to be worn for long periods of time and they apply the transformation blindly across the entire image.

Partial obfuscation techniques can also be used via partial obfuscation filters (e.g., blur, pixelating, masking, silhouette, etc.), and it has been shown that each filter affects image utility and privacy differently. Partial obfuscation methods can be used with the least privilege approach (where obfuscation is by default, and only the information needed is shown) or the block approach (where everything is shown, except for specific objects). When used in the block approach, the obfuscation is usually applied on a specific object in the image. In the least privilege approach to obfuscation, the most common obfuscation is masking a portion of the scene, which provides no information about the obfuscated part of the image in comparison to other obfuscation methods (e.g., blur and edge) which reduce the information shared rather than eliminate it completely. As discussed herein, the proposed camera system can utilize a plurality of different obfuscation filters to perform obfuscation, depending on the image, test scenario, wearer/user, etc.

Some researchers have used sensors as a way to segment the environment and extract relevant information according to distance (i.e., depth sensors). Mainly this method has been utilized in gaming scenarios and in self driving cars where access to energy is not an issue. However, in the case of wearable devices, energy is a concern. The proposed camera system demonstrates how using a very low powered wearable thermal IR array along with an RGB camera can achieve segmentation that assists in obfuscating bystanders and other contextual information from the background while preserving information about the wearer's hand-related activities (or other relevant information in the images). Additionally, a lower resolution sensor can be used in the case of a wearable camera because the focus of the recording is limited to the wearer rather than the environment.

In alternative embodiments, the camera system can include additional, fewer, and/or different components and/ or utilize different processing techniques. For example, to assist in the obfuscation of cold objects, the obfuscation pipeline system be designed to preserve information about the cold objects the frame, as their temperature is different from the environment. To do this, multiple ranges of temperature thresholds can be set using a machine learning algorithm as opposed to a simple single threshold.

A potential limitation with the proposed camera system is that bystanders have a similar temperature threshold as the wearer, and the system can fail to obfuscate the bystanders if the camera is worn in the wrong way by the user. Thus, in some embodiments, the camera system can be designed to detect a problem with the camera system and alert the user such that the user can correct the issue. For example, the problem can be that the lens is partially or entirely covered by clothing, that the orientation is incorrect, that the user's head (or other object of interest) is not in view of the camera, etc. The alert to the user can be an audio tone, a visual alert such as a light, a textual indication on a display screen, a spoken indication from a speaker, etc. In one embodiment, the system can send the alert as a text message or other notification (e.g., e-mail, automated phone call, etc.) to a user device of the wearer such that the wearer can correct the field-of-view of the system.

As discussed herein, in some embodiments, the images are encrypted on-device and then obfuscated offline by a remote computing system, human, etc. In alternative embodiments, the obfuscation can be performed in real-time on the camera system itself. In such an embodiment, encryption of the images does not have to be performed because any sensitive/private/bystander information from the images is not included in the final video. Alternatively, the video may still be encrypted. In such embodiments in which obfuscation is performed in real-time, activity/object triggered interventions can also be performed such as alerting the wearer or sending an alert to a remote location when a specific activity is being performed, such as smoking a cigarette, getting into a fight, etc. Additionally, in order to ensure that no bystander is captured, the system can also use an object detection method to detect bystanders without the need for localization as the IR sensor can act as a localization method to locate non-obfuscated images, which will make the object detection algorithm work faster and more accurately.

In some embodiments, the camera system can include a transceiver that is configured to communicate wirelessly with other devices such as a remote monitoring center, a remote computing system, a user device, etc. The transceiver can be controlled by the processor and used to transmit video (which may encrypted), images, information extracted from the video, alerts, etc. to other devices. The communication can be through any network known in the art, such as a cellular network, a Bluetooth® connection, a local area network, a wide area network, a wi-fi network, etc.

In other embodiments, the camera system can be used in conjunction with automated or semi-automated tools that help in locating images of interest. For example, computer vision approaches can be used to build adaptable timelines that can locate objects and context. Similarly, sensor data (e.g., gaze) can be utilized to summarize events of interest. The camera system is complementary to both of these techniques, and can integrate well with either approach as it provides both an RGB stream that allows for computer vision techniques as well as sensor stream provided by the IR array which allows for a focused summary of events of interest.

Thus, described herein is a camera system, which is a hardware/software system in the form of a unique multi-sensor wearable camera that provides mechanisms for privacy enhancement and has all-day battery life, paired with a novel video obfuscation pipeline system/process. Based on the evaluations described herein, it was found that a prototype of the camera system (weighing 183 grams) supports all day battery life (e.g., 12 hours) while capturing continuously in-wild with a 1200 mAh battery. It was also found that the proposed obfuscation pipeline performs significantly better in controlled comparisons of obfuscation ability to state-of-the art off the shelf methods for human and object detection.

It is to be understood that any of the operations/processes described herein may be performed at least in part by a computing system that includes a processor, memory, transceiver, user interface, etc. The described operations/processes can be implemented as computer-readable instructions stored on a computer-readable medium such as the computer system memory. Upon execution by the processor, the computer-readable instructions cause the computing system to perform the operations/processes described herein.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A camera system comprising:
    a camera configured to capture first video of a scene in the form of first image frames;
    an infrared sensor configured to capture second video of the scene in the form of second image frames; and
    a processor in communication with the camera and the infrared sensor, wherein the processor is configured to:
        monitor a temperature of the scene with the infrared sensor or a temperature sensor;
        identify a change in the temperature of the scene;

recalculate an infrared sensor threshold for the infrared sensor based at least in part on the change in the temperature of the scene;

determine an intensity threshold for pixels in the second video;

identify, based at least in part on the intensity threshold, an item of interest in the scene; and obfuscate one or more portions of the scene that correspond to the item of interest.

2. The system of claim 1, wherein the processor conducts a semantic segmentation process to determine the intensity threshold for the pixels in the second video.

3. The system of claim 2, wherein the processor determines the intensity threshold of the pixels in the second video based at least in part on thermal information associated with the scene.

4. The system of claim 3, wherein the thermal information comprises thermal values that overlap with pixels corresponding to the item of interest.

5. The system of claim 4, wherein a maximum thermal value from the thermal information comprises an infrared sensor threshold.

6. The system of claim 5, wherein the processor obfuscates the one or more portions of the scene with an infrared mask, and wherein the infrared mask is generated based at least in part on the infrared sensor threshold.

7. The system of claim 1, wherein the processor obfuscates the one or more portions of the scene with an infrared mask, and wherein the infrared mask is generated based at least in part on the recalculated infrared sensor threshold.

8. The system of claim 1, wherein the camera comprises a red green blue (RGB) camera that includes a fisheye lens.

9. The system of claim 1, wherein the camera system includes a first housing that houses the camera and the infrared sensor, and a second housing that includes one or more mounts to mount the camera system.

10. The system of claim 9, wherein the one or more mounts comprise a lanyard connector, a magnet, or a pin.

11. The system of claim 9, wherein the first housing pivots relative to the second housing.

12. The system of claim 9, further comprising a battery that is configured to continually run the camera system, wherein the battery is mounted in the second housing.

13. The system of claim 1, wherein the processor is configured to align and fuse the first image frames from the camera with the second image frames from the infrared sensor to delineate a foreground of the scene from a background of the scene.

14. The system of claim 1, wherein the processor is configured to:

detect that a field of view of the camera is improper; and responsive to detecting that the field of view is improper, provide an alert to a user such that the user can adjust the field of view.

15. A method of camera monitoring, the method comprising:

capturing, with a camera mounted to a camera system, first video of a scene in the form of first image frames;

capturing, with an infrared sensor that is also mounted to the camera system, second video of the scene in the form of second image frames;

determining, by a processor of the system, an intensity threshold for pixels in the second video based at least in part on thermal information associated with the scene, wherein the thermal information comprises thermal values that overlap with pixels corresponding to an item of interest, and wherein a maximum thermal value from the thermal information comprises an infrared sensor threshold;

identifying, by the processor and based at least in part on the intensity threshold, the item of interest in the scene; and obfuscating, by the processor, one or more portions of the scene that correspond to the item of interest with an infrared mask, wherein the infrared mask is generated based at least in part on the infrared sensor threshold.

16. The method of claim 15, further comprising conducting, by the processor, a semantic segmentation process to determine the intensity threshold for the pixels in the second video.

* * * * *